United States Patent [19]

Gorille

[11] 4,244,339
[45] Jan. 13, 1981

[54] METHOD AND SYSTEM TO CONTROL IGNITION TIMING OF AN INTERNAL COMBUSTION ENGINE IN DEPENDENCE ON AN EXHAUST GAS COMPOSITION SIGNAL

[75] Inventor: Ingo Gorille, Oberriexingen, Fed. Rep. of Germany

[73] Assignee: Robert Bosch GmbH, Stuttgart, Fed. Rep. of Germany

[21] Appl. No.: 940,159

[22] Filed: Sep. 6, 1978

[30] Foreign Application Priority Data

Sep. 6, 1977 [DE] Fed. Rep. of Germany ....... 2740044

[51] Int. Cl.³ .............................................. F02P 5/04
[52] U.S. Cl. .................................................. 123/416
[58] Field of Search .......... 123/117 D, 117 R, 32 EB, 123/32 EC, 32 EE

[56] References Cited

U.S. PATENT DOCUMENTS

| | | | |
|---|---|---|---|
| 3,903,857 | 9/1975 | Honig et al. ...................... | 123/117 R |
| 3,919,987 | 11/1975 | Haubner et al. ............ | 123/117 D X |
| 3,923,021 | 12/1975 | Stark ............................... | 123/117 R |
| 3,927,304 | 12/1975 | Wentworth et al. ........ | 123/32 EC X |
| 4,063,539 | 12/1977 | Gorille et al. ................... | 123/117 D |
| 4,122,811 | 10/1978 | Bowler et al. ............... | 123/117 D X |
| 4,133,326 | 1/1979 | Cops et al. .................... | 123/32 EC X |

Primary Examiner—Tony M. Argenbright
Attorney, Agent, or Firm—Frishauf, Holtz, Goodman & Woodward

[57] ABSTRACT

The composition of exhaust gases from an IC engine is dependent on ignition timing; to control the composition, therefore, ignition timing is adjusted in accordance with sensed exhaust gas composition signals. To prevent abrupt change of ignition timing, as the exhaust gas composition signal changes upon change of exhaust gases between reducing and oxidizing state, a limit stage is included which limits the change of ignition timing between succeeding ignition events to a predetermined incremental crankshaft angle, for example 2°. The ignition angle adjustment may be nonsymmetrical in adding and subtracting direction, and, in any event, is limited to a maximum adjustment angle beyond which undesirable or unsafe operating conditions of the engine might obtain. In a preferred digital form, the count number of an accumulator counter, the output signal of which determines the occurrence of an ignition event, is modified, in said incremental steps, to thereby control the timing of the ignition event.

16 Claims, 5 Drawing Figures

METHOD AND SYSTEM TO CONTROL IGNITION TIMING OF AN INTERNAL COMBUSTION ENGINE IN DEPENDENCE ON AN EXHAUST GAS COMPOSITION SIGNAL

Reference to related publications:
U.S. Pat. No. 4,063,539, Dec. 20, 1977, GORILLE et al U.S. Pat. No. 3,919,987, Nov. 18, 1975, HAUBNER et al U.S. Pat. No. 3,903,857, Sept. 9, 1975, HONIG et al The present invention related to a method and system to control the timing of an ignition event of an externally ignited internal combustion engine in dependance on the composition of exhaust gases from the engine, as signaled by an exhaust gas composition signal.

Exhaust gas composition analyzing sensors provide output signals which jump in value abruptly when the composition of the exhaust gas changes between oxidizing and reducing state, that is, has an excess of oxygen therein or an excess of hydrocarbon carbons and/or carbon monoxide.

BACKGROUND AND PRIOR ART.

It is known to control the timing of an ignition event in external ignition internal combustion (IC) engines in dependence on operating or operation or environmental parameters. Typical operating parameters are engine speed, loading, temperature, deflection angle of the throttle, whether the engine is under starting conditions or not, and also exhaust gas composition. In one such systems which operates digitally, temporally sequential signal trains are accumulated in an accumulator counter until the counter reaches a predetermined value. One of the signal trains is derived from a memory which is addressed in dependence on the external operating parameter by an address counter. When the accumulator has reached a predetermined count state, which can be determined by comparison with a suitable decoder or matrix, the ignition event is triggered, for example by controlling opening of a switch in the primary of an ignition coil, thus inducing at least the first one of a spark flash-over at a spark plug.

IC engines can be operated with fuel-air mixtures supplied either by a carburetor or by a fuel injection system, in which typically an electronic fuel injection system is provided. The amount of fuel being injected can be controlled in dependence on exhaust gas composition, to optimize the composition of the exhaust gases in the sense that they provide a minimum of noxious components. Fuel injection systems of this type are usually controlled by an oxygen sensor located in the exhaust pipe or exhaust channel from the IC engine, operating as a $\lambda$ sensor in form of a $\lambda$ control. Carburetors, also, can be adjusted, for example by an electromagnetic positioning element to vary the through-put of fuel with given throttle positions in dependence on exhaust gas composition. Changing the operating characteristics of a carburetor is much nore difficult, however, then changing the operating conditions of an electronically controlled fuel injection system.

It is well known that ignition timing has a definite effect on the operating characteristics of an IC engine, and it is also known that ignition timing has an effect on the exhaust gas compositon from the engine.

THE INVENTION

It is an object to control the operation of an IC engine for minimum exhaust gases regardless of whether the engine has a carburetor or fuel injection system to provide the fuel-air mixture by controlling the ignition timing as a function of exhaust gas composition in such a manner that an electronically controlled ignition system is modified only slightly, and inexpensively, to obtain exhaust gas composition control with minimum expense and technological difficulty.

Briefly, a $\lambda$ sensor provides an output signal which is used to modify the ignition timing which is computed by an electronic ignition timing system in such a manner that, in dependence on the output signal, the ignition timing is either advanced or retarded in a direction to change over the output from the $\lambda$ sensor, so that the exhaust will continuously vary slightly above and below the desired minimum value, thus, on the average, providing exhaust from the engine of minimum noxious content. The ignition timing is not changed abruptly over a wide advance or retardation angle, however, but rather is changed, for each ignition event in the direction determined by the $\lambda$ sensor over a partial, small adjustment angle which is superimposed on the ignition timing angle adjustment computed in accordance with the standard ignition timing computer. This adjustment angle increment is algebraically added to each ignition event until a maximum additional angular adjustment is obtained or until a maximum angular adjustment of ignition timing is reached which is controlled by external operating parameters and beyond which no adjustment should be made for safety or operating reasons.

In accordance with a feature of the invention, the system includes a limit setting stage which permits change of the ignition angle with respect to a previously occurring ignition event over a limited angular range of ignition adjustment only.

The invention starts from the realization that in IC engines the ignition timing has a marked influence on the composition of the exhaust gases. The invention then is based on the converse of this realization, namely that the exhaust gas composition can be controlled by controlling ignition timing and, since modern ignition systems frequently have an electronic timing adjustment computer, that it is a comparatively simple matter to so modify such a computer to respond to signals representative of the composition of exhaust gases. In general, the invention thus relates to control of the composition of exhaust gases, or, respectively, optimizing the composition of the exhaust gases from an IC engine by sensing the composition by means of a sensor located in sensing relation to the exhaust gases and including the sensor in a feedback loop which includes an ignition timing adjustment computer. The ignition timing adjustment computer, preferably, operates digitally, although the present invention can also affect the computation of an analog computer. Various types of ignition timing computers may be used, and the present invention is not limited to any particular one, or to the one described below.

The output signal from a $\lambda$ sensor is, essentially, a digital signal which abruptly changes its characteristic in dependence on the composition of the exhaust gases, that is, whether they are lean or rich (oxidizing or reducing). Such an abrupt change of the signal, if directly applied to an ignition timing system, may cause rough operation of the engine, however, and thus, in accordance with a feature of the invention, the actual change or adjustment of the ignition timing angle varies from one ignition event to the next only in small increments. These linearly occurring small increments will occur, one after the other, until a predetermined maximum additional change to ignition timing is obtained—additional over and beyond that controlled by operating conditions and parameters of the engine. When this maximum angle is reached, and the sensor signal changes the additional or incremental change is reset immediately to zero or null; the actual change of the ignition angle, however, as controlled by the system and in accordance with the method, again varies linearly from ignition event to ignition event in small incremental jumps, so that any abrupt substantial change of the operating condition of the IC engine is avoided. The reaction time of the control system is much shorter than that in fuel injection systems having λ control.

Drawings, illustrating a preferred example:

FIG. 1 is a very general schematic block circuit diagram of an electronic ignition control computer having a plurality of external operating parameters applied which determine the ignition timing of an ignition event in an IC engine, and illustrating further the feedback of signals from an exhaust gas sensor to one of the inputs of the ignition timing computer;

FIG. 2, in two aligned graphs, shows the curve illustrating the actual change in ignition timing with respect to the output voltage from a λ sensor;

Figure 1:
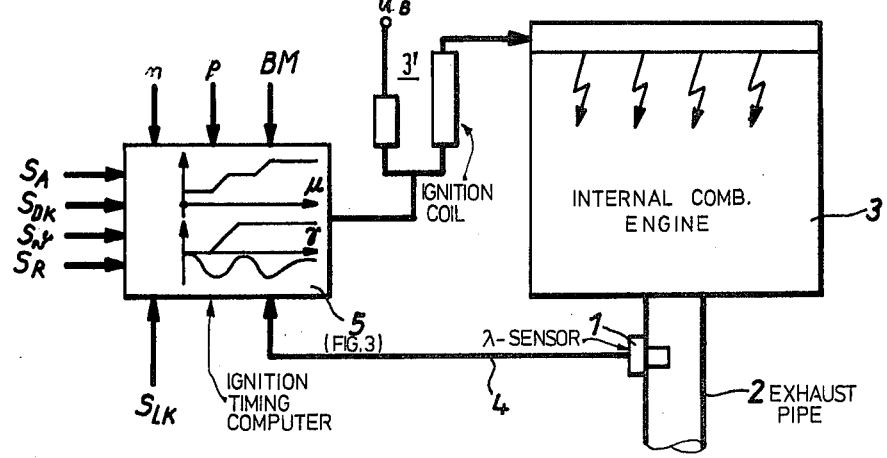

The system of FIG. 1 is intended for use with an internal combustion engine 3 having an exhaust pipe 2 in which a λ sensor is mounted. The λ sensor 1 is so arranged that it is exposed to exhaust gases from the internal combustion engine. The λ sensor measures the oxygen content of the exhaust gases and provides, over line 4, a signal illustrated in graph b of FIG. 2 to an ignition timing computer 5. The ignition timing computer 5 controls the opening of a switch serially connected with the primary of ignition coil 3' so as to induce a high-voltage pulse in the secondary thereof to cause an ignition event. The ignition coil is energized by voltage Ub.

Figure 3:
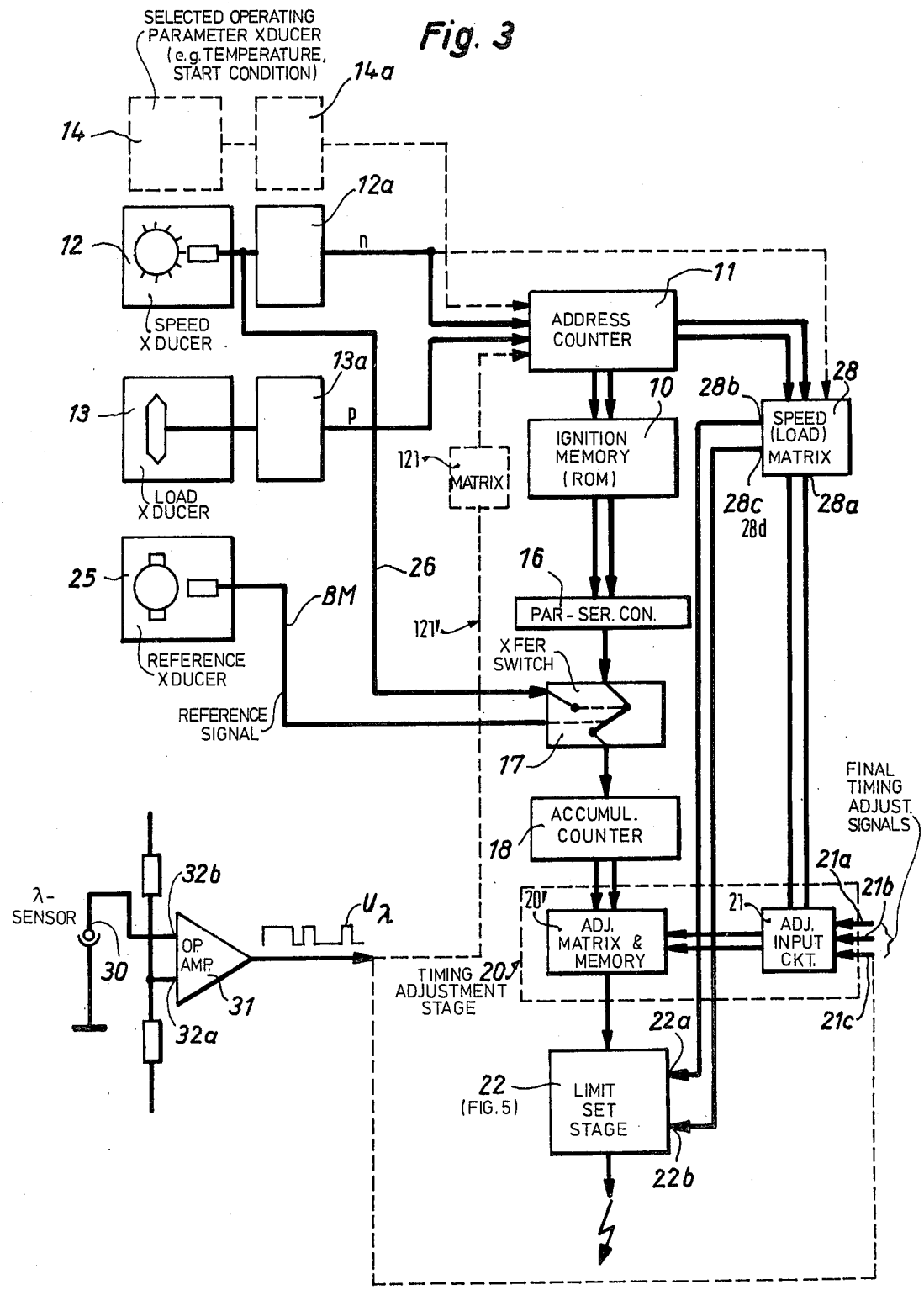
FIG. 3 is a schematic block diagram of an ignition timing computer in which elements not necessary for an understanding of the present invention have been omitted, and illustrating a system operating digitally.

The ignition timing is controlled by the electronic timing control system 5, shown in detail in FIG. 3.

The control is an integral control and so arranged that, in succeeding ignition events, the ignition angle $\alpha z$ is changed, in incremental steps by small angles $\Delta \alpha$. The signal delivered by the λ sensor 1, exposed to the exhaust gases in exhaust pipe 2, is a binary-type switching signal which, after processing, varies between two states, for example 0 and a level $u_2$. The computation unit 5, used to compute the ignition timing or the ignition advance (or retardation) angle will compute this ignition timing event, with respect to top dead center (TDC) position of a respective piston in the IC engine in dependance on various operating parameters, applied to the computer 5 in the form of electrical signals. Typical operating parameters are engine loading, applied by signal p; engine speed, applied by a signal n. A signal which provides a reference, for example representative of a predetermined angular position in advance of TDC, is shown schematically as BM. Other operating parameters can be applied to the computer, for example whether the engine is under starting signal condition-signal SA; a signal representative of engine throttle deflection angle, signal SDK; a signal representative of engine temperature Sδ; any other signal SR, for example absolute ambient air pressure, outside temperature, intake air temperature, or the like, or any other randomly selected operating parameter which may or may not be used, indicated by the signal SR. The system is applicable for use with any number of different types of engines and transmissions; the operating conditions of the engine do change, however, with different models, and transmissions and drive train gear ratios. The system can, accordingly, be modified by introducing another signal which for any system may be present or fixed, or may change with different gear ratios, and schematically indicated as a load curve signal SLK.

In accordance with the invention, the λ sensor switching signal causes a shift in the ignition timing computed by the computer 5 based on the parameters applied thereto until a predetermined maximum change of ignition angle $\alpha_E$ (FIG. 2, graph a) which is beyond that controlled or commanded by the ignition timing computer 5, absent the λ sensor signal, is obtained. A limit set stage 22 (FIG. 3), and described in detail below, prevents an abrupt change of the ignition timing angle by the value $\alpha_E$, however. Rather, the actual change will be gradual, with succeeding ignition events. The actual change in ignition angle will not be that of the maximum $\alpha_E$, as commanded by the λ sensor 1, but rather in incremental small angles $\Delta \alpha$, changing from ignition event to ignition event, as best seen in graph a of FIG. 2. Consequently, each adjustment step will be independent of the value or magnitude of the signal from sensor 1. When the maximum ignition adjustment angle $\alpha_E$ has been reached, the steps will decrease.

Figure 2:
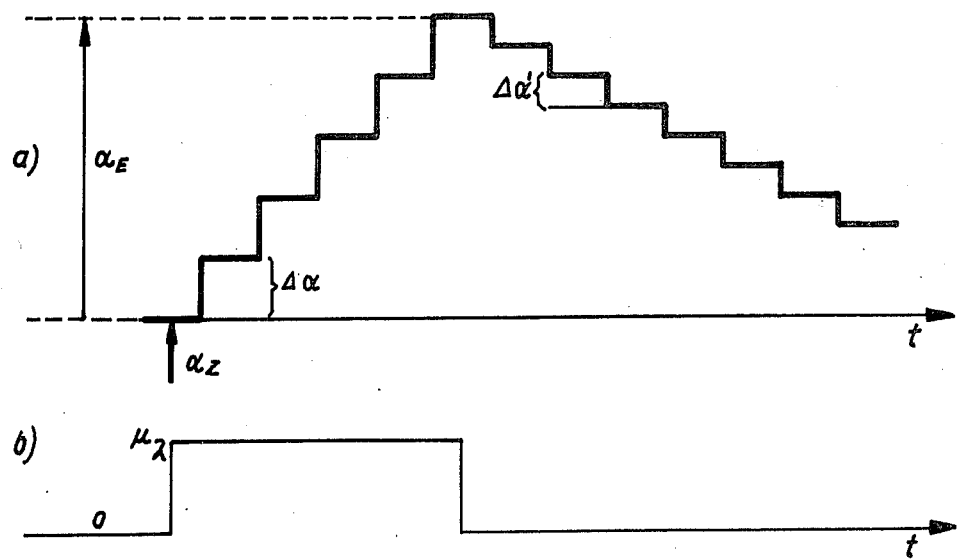

The ignition angle thus increases linearly until the maximum angle $\alpha_E$, determined by the ignition angle control, has been reached. When the sensor voltage $u_2$ changes from the 1-signal level to the 0-signal level, the ignition timing computer 5 sets the additional angle $\alpha_E=0$; due to the limit circuit, however, the actual change of ignition angle from one ignition event to the next will again be in increments $\Delta \alpha'$ in the direction of the value commanded by the output signal from the sensor 1. As the curve in graph a of FIG. 2 shows, depending on the direction of change of the ignition angle, the incremental small change angle $\Delta \alpha$ can differ the incremental change $\Delta \alpha'$ so that a change in one direction is reached faster than a change in the other. No adjustment will be made if the λ sensor signal remains at the zero or null level once the descending curve of graph a of FIG. 2 has reached the zero or null line. Upon the next change or jump of the sensor, the cycle will repeat.

λ control of ignition timing is preferably carried out in conjunction with a digital ignition timing computer, although the invention is not limited to a digital system. The digital system has substantial advantages over an analog system, however, particularly essential immunity to swings in supply voltage, spurious signals, and superimposition of stray or noise signals which may be derived due to the operating conditions of the vehicle, for example when it passes beneath a high-tension power line.

The limit set for the incremental changes $\Delta\alpha$ from ignition event to ignition event can be programmed in various ways. As shown, it is symmetrically programmed in ascending direction and also symmetrically programmed in descending direction differing, however, in the angle of change between succeeding ignition events. The slopes of the control curves are different, as can be clearly seen by considering the ascending and descending portions of the curve of graph a of FIG. 2. Since the increment can readily be programmed, the integration time constant can also be changed, for example in dependence on the sign of the signal from the $\lambda$ sensor, that is, whether the adjustment is ascending or descending. The incremental change of the ignition timing by the crankshaft angle $\Delta\alpha$ is carried out with respect to each ignition event and, thus, is speed-dependent. As can readily be seen, the integration time constant thus varies with speed, so that speed is a factor in the the integration time. Other factors can also be programmed into the system.

The maximum adjustment angle $\alpha_E$ which is possible by the addition of the incremental changes $\Delta\alpha$ is to be so selected that regions of ignition events which may be dangerous in operation of the engine are prohibited. This can readily be done when using a digital ignition computer by suitable programming to prohibit exceeding certain limiting angles. It is thus possible to limit the ignition timing adjustment in accordance with the present invention to permitted ranges.

FIG. 3, illustrating, highly schematically, a digital ignition timing control system, described in greater detail in U.S. Pat. No. 4,063,539, Dec. 20, 1977, GORILLE et al. The digital ignition timing computer uses signals derived from a speed transducer 12, coupled to a crankshaft of the engine and processed in a signal processing section 12a, which signals are summed. In addition to recurring signals which are scanned, a reference transducer 25 provides a reference signal BM at a predetermined angular position of the crankshaft of a piston of the engine with respect to TDC. This signal may be scanned based on a marker on a disk, or can be computed, or derived from the transducer 12 as well. However obtained, the marker signal BM causes a transfer switch 17 to switch over and count pulses derived from speed transducer 12 after the pulses originally summed have been added, compared, and processed or modified in accordance with engine operating or operation parameters. When a final accumulator counter, in which the first derived signals and the later added signals have reached a predetermined counter state—which can be determined, for example, by a logic circuit, a matrix, or wired into the counter—a trigger signal is provided which determines the ignition timing event, controlling, for example, opening of a previously closed transistor in series with the ignition coil 3' (FIG. 1). The ignition system itself, which controls the generation of the spark, does not form part of the present invention and may be of any suitable type.

The ignition timing with respect to TDC of a piston depends on the engine as well as operating conditions and parameters at the time. Various characteristics determine optimum ignition, for example the then existing speed, loading, or whether, in an automotive application, the vehicle is ascending a grade or going downhill. The then existing characteristics of operation with respect to ignition timing may have slopes which may be positive or negative. In a digital ignition computer, then, and as preferred for use with the present invention, a memory 10, preferably a read-only memory (ROM) is provided in which the values for the various operating characteristic curves are stored. Negative values can also be stored in order to provide a negative slope of an adjustment curve. Any desired operating characteristic curves, and families of curves, can thus be stored in the ROM 10 in order to derive optimum computed ignition timing instants in dependence on various external operating parameters. The respective stored values are read from the ROM 10 preferably by an address counter 11 which generates the respective addresses in dependence on operating parameters, supplied thereto in the form of operating parameter signals. The primary operating parameters which should be considered are instantaneous speed and loading on the engine, since these parameters have the greatest influence with respect to ignition timing. Additionally, temperature and other operating conditions can be included in the memory 10, as discussed in connection with the signals SA, SDK . . . etc. of FIG. 1.

The various operating parameter signals are derived from transducers schematically shown at 12, 13 and 14 of FIG. 3. Transducer 12 is a speed transducer; transducer 13 provides a signal representative of the pressure (or, rather, vacuum) in the induction pipe of the IC engine, which is representative of loading on the engine. Block 14, shown in broken lines, generally illustrates, schematically, various transducers providing output signals of selected operating parameters, for example temperature, start condition, or any of the other variable or selected parameters described in connection with FIG. 1. Each one of the transducers 12, 13, 14 has a wave shaping circuit 12a, 13a, 14a connected thereto which provides output signals which are capable of being processed by the address counter and are normalized with respect to the operating voltages thereof. Various solutions to computing the ignition timing event have been proposed, some somewhat simpler than that shown in FIG. 3, and hence less accurate, or less responsive to changes in operating conditions. The operation of an electronic digital ignition timing computer is best understood, however, when considering the system of FIG. 3, in which the various storage addresses of the ROM 10 are directly addressable and will read out the desired values themselves. The wave shaping and processing circuits 12a, 13a, 14a connected to the respective transducers 12, 13, 14, are so constructed that for any one computing cycle between two ignition pulses—in a four-cylinder engine, 180° crankshaft angle, address counter 11 will receive in normalized form, cyclically, in time multiplex system, those signals which are representative of the conditions sensed by the transducers; the address counter 11 then can, immediately, apply a respective address to the ROM 10 which corresponds to the operating parameter, then being detected, that is, which has just been counted by the address counter 11 during the respective counting cycle. For example, the circuit 12a, besides wave shaping circuitry and the like, can include a gate which applies pulses from the speed transducer 12 to the address counter 11 only during a predetermined time interval, for example, between time $\tau_1$ and $\tau_2$—see FIG. 4—so that the counter 11 then will have a count state corresponding to speed. The ROM 10 is addressed with this speed number and will deliver a predetermined stored word from the ROM 10 which is connected through a parallel-serial converter 16 and through a transfer switch 17 to an accumulator counter 18, to be there accumulated.

Figure 4:
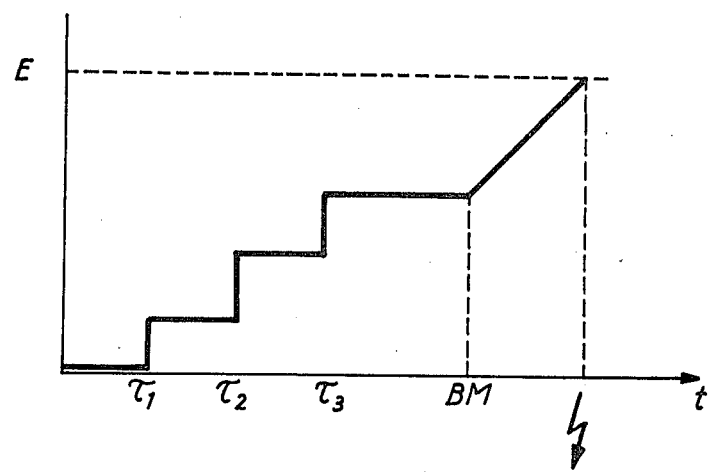
FIG. 4 is a schematic graph showing the count state of an accumulator counter in the ignition computer, with respect to time.

During a subsequent time interval, for example between $\tau_2$ and $\tau_3$, similarly, the counter 11 will count to another address in which the characteristics of loading at a given speed with respect to ignition timing are stored and, at the end of that counting cycle, ROM 10 will apply the corresponding output work through parallel-serial converter and transfer switch 17 to the accumulator counter 18. As can be seen, the accumulator counter 18 will serially add so many binary words as interrogated operating parameters are present which can influence the stored values in ROM 10. The result in the accumulator counter 18 will be a count state representative of operating parameters at a predetermined time instant which must be sufficiently in advance of TDC, so that the largest ignition advance angle can be controlled or commanded. The ROM 10 is preferably so programmed that it stores increments of the characteristics. The accumulator counter then retrieves the characteristics by addition of the increments, so that the operating characteristics of the system can be graphically illustrated by the count state represented in FIG. 4. FIG. 4 illustrates the count state of the accumulator counter 18, with respect to time, after the words retrieved from ROM 10 have been accumulated therein. Each ignition event additionally includes a feedback to reset the accumulator counter 18 to a predetermined initial value, for example to the count size zero. It is not necessary, however, to reset the accumulator counter 18 to count state zero, but other values—which may change—may be selected, as will appear. The various values in ROM 10 are interrogated at the respective interrogation instants $\tau_1$, $\tau_2$, $\tau_3$, and are summed in the accumulator counter 18. Upon sensing of the reference signal BM, transfer switch 17 is caused to change over, thus isolating the ROM 10 from the accumulator counter 18 and, thereafter, count pulses in form of a sequence, the frequency of which is speed dependent, are added. When the counter 18 reaches a count state which is determined by various operating conditions, or which may be preprogrammed or prewired, an ignition trigger signal is generated, and the cycle commences anew. The ignition time, that is, the timing of the next ignition event as indicated by the lightning arrow, is newly computed. The reference signal BM is associated with a predetermined angular position of the crankshaft of the respective pistons and is used to provide an unambiguous reference of the computed ignition angle with respect to TDC of the respective cylinder. The counting starting from the occurrence of the reference signal BM must be in accordance with a frequency which is essentially synchronous with crankshaft angle deflection after the reference marker, since the reference marker is unambiguously associated with the predetermined angle. During this second counting interval, when the frequency of counting is in synchronism with rotation of the crankshaft, other operating parameters may also be considered and, in accordance with a feature of the invention, it is this time during which the voltage of the output of the λ sensor is considered. It is also possible to consider other operating parameters, for example the position of the throttle, in form of binary signals which can be incorporated in the counting cycle by suitable modification of the frequency, interposition of an additional counter, or modification of the final timing result to be obtained.

The ignition timing event thus can be modified in various ways, by influencing:

(1) the initial count state of the accumulator counter 18;

(2) the contents of ROM 10, for example by additional control of the address counter 11, provision of a further address counter 11 connected to separate sections of the ROM 10 for generating different addresses simultaneously with counting of address counter 11; and (3) selected final value EW of the accumulator counter 18.

In accordance with the present invention, the accumulator counter 18 has a final value adjustment stage 20 connected thereto. Stage 20 includes an adjustment matrix 20' in which a predetermined end number is commanded in dependence on separate operating parameters above referred to and, if desired, additional operating parameters. These final timing adjustment signals are applied over inputs 21a, 21b, 21c. The matrix itself, shown at 20', can be realized e.g. with PLA's (e.g. IM5200 from Intersil). The matrix 20' is connected to a limit set stage 22 which then provides the actual ignition trigger pulse when the final numerical value as adjusted in accordance with the command of the adjustment stage 20 is reached in the accumulating counter 18.

The signals at the respective inputs 21a, 21b, 21c to the timing adjustment stage 20 are transferred to the matrix 20' through an adjustment input circuit 21 which provides a buffer and such signal processing as is necessary for proper control of the matrix 20'.

The transfer switch 17 is provided so that the values derived from the ROM 10 can be first accumulated in counter 18 and then accumulated in accordance with speed signals. The speed signals can be derived, again, from the speed transducer 12. The transfer switch 17 is controlled by the reference signal BM, derived from the reference transducer 25, to connect the input of the accumulator counter 18 to line 26 and thus to the output pulse sequence from speed transducer 12. Suitable wave shaping circuits, and the like, and normalizng circuits for proper interconnection of the speed transducer 12 and accumulator counter 18 have been omitted from the drawing for clarity, and are well known and need not be described in detail.

The address counter 11 may have an additional external controllable matrix 121 connected thereto, additionally controlled by an external operating parameter, as shown by broken line 121'. Matrix 121 is used to preset the address counter 11 to a predetermined value so that the addresses generated thereby will have different values than those if the matrix 121 were absent, or is not controlled. These changed addresses will then cause a change in the value of the words read out from ROM 10, resulting in a shift of the characteristics read out from ROM 10. If the final accumulated value is constant, the same effect is obtained as a shift in the reference level of the address counter, or its initial position, or a shift in the zero position (referring to the graph of FIG. 4) upon control by the matrix 121 to shift the starting address of counter 11.

A matrix 28 which decodes speed signals, derived from the speed transducer 12 through the address counter 11 has one output 28a coupled to the timing adjust stage 20 and specifically to the input circuit 21 thereof. The speed signal matrix 28 has two additional outputs 28b and 28c which are connected to respective inputs 22a and 22b of a limit set stage 22. The speed matrix 28, basically, can be constructed similarly to the timing adjustment stage 20 and can be constructed in integrated circuit form, as a transistor matrix. The transistor speed matrix 28 supplies two signals, temporally staggered with respect to each other. A first signal is applied from output 28b to the input 22a of the limit set stage 22. Let it be assumed that the subsequent ignition event is to occur at a crankshaft angle 180° after the preceding ignition event. The signal applied from output 28b to the input 22a of the limit stage will then be, for example, 178° after the last preceding ignition event. A second signal is derived from output 28c of speed matrix 28 and applied to the input 22b of the limit set stage. This signal would correspond to an ignition angle of 182°, with reference to the last preceding ignition event. In other words, the limit stage 22 receives control signals from the speed matrix 28 which are in the direction of ignition advance as well as ignition retardation by a maximum incremental angle $\Delta\alpha$ which, in the example assumed, is 2°. This angle of $\Delta\alpha=2°$ can be in advance as well as in retard with respect to the angle of 180° which is assumed. The overall range with respect to the last ignition event then will be $\pm 2°$.

The inputs 21a, 21b and 21c of the adjustment input circuit 21 of timing adjustment stage 20 permit the superposition of signals overriding or modifying a number which is compared with the number which is accumulating in the accumulating counter 18, as it counts, and thus permits changes in ignition timing in dependence on operating or environmental conditions of the IC engine in accordance with the signals applied to the respective inputs 21a, 21b, 21c. Thus, selected overriding command of the ignition timing computation can be carried out by applying input signals to the adjustment input circuit 21. The input circuits 21a to 21c may have signals applied thereto representative, for example, of temperature, idle condition of the engine, starting condition of the engine, and, and especially in accordance with the present invention, exhaust composition of the exhaust gases from the engine derived from the $\lambda$ sensor output signal U$\lambda$ (FIG. 3). The adjustment matrix 20 is preferably so programmed that it cannot provide output signals exceeding a certain predetermined final limit which, if it would be exceeded, might result in dangerous or undesirable operating conditions of the IC engine. If the timing matrix responds then it will provide a signal to the subsequent limit set stage 22, in dependence on the signals superimposed on the computed ignition signals and applied by the respective inputs 21a to 21c and the output from the speed matrix 28 from terminal 28a. This signal which will be supplied by the timing adjustment stage 20 to the limit stage 22 will be furnished when the count state of the accumulating counter 18 has reached the adjusted final count value set into the timing adjustment stage, and specifically into the adjustment matrix 20'. This signal will be the ignition command signal, supplied through the limit set stage 22, provided it is within the permitted range of variation of the change of ignition angle of $\pm\Delta\alpha$.

The interrelationship between the speed matrix 28 and the limit stage 22 will be discussed below; first, however, the circuit which furnishes the U$\lambda$ signal (FIG. 3) will be described. Such a circuit may be one which is known per se. It is known to derive the output signal of a $\lambda$ sensor 30 as an actual signal representative of exhaust gas composition of the IC engine which, of course, will be a function of the composition of the fuel-air mixture supplied to the IC engine as well as the combustion conditions pertaining within the IC engine. By use of an oxygen ion concentration cell, which is customary in $\lambda$ sensors 30, it is possible to operate an IC engine such that combustion therein will be complete. The exhaust gas sensor, a control circuit, and the engine itself form a closed control loop. The control path or command is provided by the ignition timing computer 5 in the present system. The output signal of the $\lambda$ sensor 30, exposed to the exhaust gases in the exhaust pipe of the IC engine, changes abruptly depending upon whether the exhaust gas has a lean or rich composition, that is, has an excess of oxygen or an excess of unburned components. The band width within which the sensor operates is very narrow. The $\lambda$ sensor output signal is compared with a threshold reference. Typically, and as shown, a comparator 31 which in a simple form may be an operational amplifier, is provided, one input of which is connected to the output of the $\lambda$ sensor 30 and the other input of which is connected to a fixed voltage level derived from a voltage divider connected between a source of regulated voltage. The input 32a of the operational amplifier 31 thus has a reference applied thereto, the input 32b a signal derived from the $\lambda$ sensor 30, directly or indirectly, or representative thereof. The output of the comparator 31 then is a pulse train U$\lambda$ which will have a 1-signal level or a 0-signal level in dependence on whether the signal supplied by the $\lambda$ sensor 30 is above or below the threshold reference as determined by the input 32a of comparator 31. The output signal U$\lambda$ thus will be a binary switching signal, in form of a series of square wave pulses, which is applied to the ignition timing computer to command ignition timing adjustment for the maximum permitted change in ignition angle $\alpha$E, for example by being applied to input 21c of the input circuit 21 of the adjustment matrix 20'. If the voltage of the sensor 30 is such that the output will be a logic 1-signal, the ignition timing can be shifted under command of this signal by the angle $\alpha$E; this shift cannot be done in one single jump, but only in increments $\Delta\alpha$.

Figure 5:
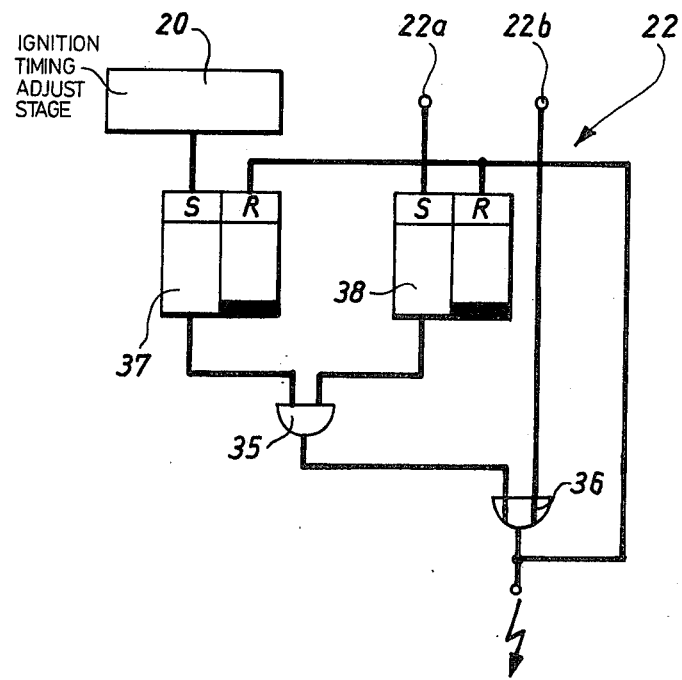
FIG. 5 is a block circuit diagram of a limit set stage for use in the computer of FIG. 3.

The limit stage 22 is provided to prevent application of a large change in angle $\alpha$E during any one ignition event. FIG. 5 illustrates a suitable circuit for limit stage 22.

The ignition timing circuit 20 is connected to the SET input of a flip-flop (FF) 37 which is paired with another FF 38. The FF's, preferably, are RS FF's. Additionally, an AND-gate 35 and an OR-gate 36 are provided. Input 22a of the limit stage 22 is connected to the SET input of FF 38. The other input 22b and, in the present example representative of the higher or retard angle of 182°, is directly connected to the OR-gate 36. The outputs of the FF's 37,38 are connected to the two inputs of AND-gate 35. The output of AND-gate 35 forms another input to OR-gate 36.

Operation: The speed matrix 28, the output signals of which are connected to the inputs 22a and 22b of the limit set stage 22, is so constructed, as discussed above, that it provides command pulses which correspond to an angle of $\pm 2°$, with reference to the last preceding ignition event. To do so, the speed matrix evaluates the counter state of the address counter 11 at any time. A suitable speed signal is needed, however, which can also be obtained directly from the speed transducer 12, through suitable coupling circuits, if the signal is of such nature that it can be processed in the matrix. The speed matrix 28 operates, in principle, as a crankshaft angle decoding stage.

The limit stage 22 then will provide the signal which immediately controls the opening of a switch in the primary of the ignition circuit, that is, which directly controls the ignition event within an angle or, rather, an angular range, of $\pm\Delta\alpha$ after the next preceding ignition, as described in connection with the present example, which is with reference to a four-cylinder IC engine. The angular range of $\pm\Delta\alpha$ or of $-\Delta\alpha$ need not be symmetrical. Let it be assumed that an ignition angle of at least 178° is to be commanded. If, for example, a pulse is derived from the timing adjustment stage, then FF 37 will be SET and the AND-gate 35 will have a single enabling signal applied thereto. AND-gate 35, however, will not yet be conductive, or transfer a signal, since the other FF 38 does not yet have a 1-signal signal applied thereto but, rather, has a logic 0-signal. As soon as a pulse is derived at the input 22a from the speed matrix, which will be the 178° pulse, FF 38 will SET and AND-gate 35 will become conductive and apply an ignition trigger pulse through OR-gate 36. Simultaneously, the FF's 37, 38 will be RESET for the next subsequent cycle. If the timing, commanded by a pulse from the timing adjustment stage is within the $\Delta\alpha$ range, then the initial pulse corresponding to 178° at the input 22a, causing the FF 38 to set, is not, by and itself, capable of commanding an ignition event. Rather, an ignition event will be commanded only when the timing adjustment stage 20 provides an output pulse, causing FF 37 to set and gate 35 to become conductive.

If the ignition timing adjustment stage 20 provides for delayed output pulses which are delayed to such an extent that it does not occur before 180° of crankshaft angle rotation, then the speed matrix 28 will provide the pulse at the 182° angle over the other output line from matrix 28, applied to input 22b which is directly connected to OR-gate 36 to command an ignition event. The speed matrix 28 thus will provide an ignition event regardless of prior settings although it may be delayed.

The limit angles and the range $\Delta\alpha$ can be programmed by suitable setting of the speed matrix 28, both in ascending as well in descending direction and maximum variations of ignition angles with respect to a previously occurring ignition event can be controlled thereby.

The sensor voltage $U\lambda$ can be introduced at various points in the digital ignition timing computer in order to change the ignition timing. The sensor and the engine thus form part of a true control loop.

The speed matrix 28 can be programmed not only with respect to speed, although this is the preferred and simplest way and it therefore has been so labeled; it can additionally, or instead of speed be programmed to control based on loading of the IC engine, by making the angle $\alpha E$ additionally dependent on load of the engine. This is readily possible in a digital ignition computer. For example, a switch-over can be provided, controlled by a thermal switch which distinguishes between, for example, cold and normal operating temperature of the engine, and then generating load characteristics which will differ depending on engine temperature. These two load characteristics can be varied, or have superimposed thereon, the signal from the $\lambda$ sensor. Thus, it is possible to use supervisory control of the $\lambda$ sensor, for example, only under specific and predetermined load conditions, or predetermined temperature conditions, or temperature and load conditions. Control thus can be effected, for example, only under specific loading conditions, or loading can be considered as a weighting factor with respect to ignition timing adjustment. Any desired load characteristics can readily be programmed and stored in the form of digital signals in memory 10.

If an additional ignition timing angle $\alpha E$ is used in ignition control, a further input, for example derived from output terminal 28d of the matrix 28, will be needed for the timing adjustment stage 20. Alternatively, one of the inputs 21a, 21b can be used. If ignition angle timing is adjusted, additionally, in accordance with load, then preprogrammed load characteristics are switched in dependence on the signal value, or characteristic of the then instantaneously pertaining signal from sensor 30, that is, in dependence on the instantaneous value of the signal $U\lambda$. The limit set stage 22 will continue to operate, however, and will make any changes in the angle of ignition timing, in dependence on the output signal $U\lambda$ from the sensor 30 extend over an angular range only in accordance with the programmed increment and not in accordance with a maximum value $\alpha E$.

Various other ways are possible to introduce the sensor voltage $U\lambda$ into the ignition timing computer 5. For example, the voltage $U\lambda$ can be introduced directly through matrix 121 to the address counter to set its initial value, as described above. Nevertheless, the limit set stage 22 will not permit sudden changes in ignition timing beyond the preprogrammed increment. Another modification would be the provision of an additional counter connected to the accumulating counter 18 and adding, algebraically, increments in dependence on the output from the sensor 30, depending on the instantaneous voltage of the output $U\lambda$, thus providing for change of the ignition timing angle based on control output derived from sensor 30. Such a counter is preferably effective during the period before the reference signal BM is applied, for example during one of the periods between the start of the cycle and the reference signal BM (see FIG. 4) to permit addition as well as subtraction from the otherwise obtained results. By limiting the count stages of such an additional counter to that number which corresponds to the maximum increment $\Delta\alpha$, no changes greater than that increment can occur between succeeding ignition events. The maximum number of these increments which can be added can be counted or decoded, thus determining the maximum adjustment $\alpha E$. Of course, if the sensor signal from sensor 30 should change, the maximum number of adjustment may never be reached, and the counter can then command a change in ignition angle in the opposite direction, for increments which will depend on the count stages of the counter and its decoding logic. This is a simple way to make non-symmetrical ascending and descending changes in ignition angle timing adjustment.

The present invention permits use of the output signal of a $\lambda$ sensor to control combustion in an internal combustion engine by changing the ignition timing so that a simple way of controlling the operation of the engine, based on exhaust gas composition, can be obtained even though the engine may be equipped with a carburetor which, inherently, is difficult to control. Rather, carburetor-equipped, typically automotive-type IC engines, can be controlled based on the exhaust gas composition when equipped with an ignition timing computer, preferably a digital ignition timing computer apparatus.

The curve $\gamma$ (FIG. 1) in the ignition timing computer 5 is the normal load curve. The undulating line beneath the curve $\gamma$ represents a second load curve which can be selected by control line $S_{LK}$. The gas composition output signal Uλ is connected to the input $S_{LK}$, which is a binary input, of the coignition computer. Change of the ignition angle then is adjusted to the load conditions of the engine because the switch $S_{LK}$ selects between the load curved γ and the undulating load curve.

Various changes and modifications may be made within the scope of the inventive concept.

I claim:

1. In an internal combustion engine system a method to control the composition of the exhaust gases therefrom comprising generating an exhaust gas signal (Uλ);

generating crankshaft position signals representative of the instantaneous position of the crankshaft with respect to a reference position (top dead center—TDC);

generating an ignition event control signal at a predetermined angular crankshaft position with respect to said reference position (TDC);

and superimposing an ignition angle adjustment signal under control of said exhaust gas signal (Uλ) on the generated ignition event control signal as a function of said exhaust gas signal which includes the method steps of changing the angular relation of successive ignition event signals with respect to the reference position in an angular incremental step ($\Delta\alpha$) of a predetermined angular value, which angular step is independent of the magnitude of the exhaust gas signal and small with respect to a maximum adjustment angle ($\alpha E$);

repeating the foregoing method step, and algebraically adding the subsequent angular increment to the prior angular crankshaft position at which the ignition event control signal is then generated;

and continuing to repeat the two preceding method steps.

2. Method according to claim 1, further comprising the step of determining a limiting angular crankshaft position to said reference position at which the ignition event may occur;

and inhibiting change in said angular relation in said incremental steps when ignition at said limiting angular crankshaft position is reached.

3. Method according to claim 1, wherein the exhaust gas signal (Uλ) is a binary signal;

and said incremental steps ($\Delta\alpha$) change the angular relation of the ignition event signal in additive, ignition-retarding direction when said binary signal has one value and in subtractive, ignition advancing direction when said binary signal has another binary value.

4. Method according to claim 3, wherein the incremental steps ($\Delta\alpha$; $\Delta\alpha'$) of respective change in ignition retarding or ignition advancing directions are dissimilar.

5. Apparatus to control ignition timing of an internal combustion engine in dependence of exhaust gas composition having a sensor (1, 30) exposed to exhaust gases from the engine and providing a gas composition output signal representative of the composition of the exhaust gases from the engine;

crankshaft position signal generating means (12, 12a) providing a train of output signals representative of instantaneous position of the crankshaft of the engine with respect to a reference position (top dead center—TDC);

and timing adjustment means (20, 121) connected to receive the gas composition signal derived from said sensor (1, 30), connected to and controlling said ignition event generating means to shift the time relation of the ignition event control signal with respect to said reference position (TDC) in dependence on the nature of the gas composition signal and wherein, in accordance with the invention, a limit means (20', 21, 22) is provided connected to receive said gas composition signal from said sensor and providing a sequence of control signals to said ignition event generating means, each said control signals controlling change of the angular relationship of ignition events with respect to said reference position (TDC) in respective successive incremental steps with respect to successive ignition event signals, in which the angular change of each incremental step ($\Delta\alpha$) is independent of the magnitude of the gas composition signal and changes the ignition timing by a predetermined incremental angle in accordance with the control signal from said light means, by an angle which is small with respect to a maximum adjustment angle ($\alpha E$)

to control change of said adjustment in said incremental steps up to said maximum adjustment angle and to provide said incremental steps and hence a limit to each change of the timing of the ignition event with respect to said reference position, superimposed on the timing as determined by said ignition event means, up to a final limit defined by said maximum adjustment angle, whereby the change in ignition timing between succeeding ignition events is controlled to occur sequentially over said incremental step or angle ($\Delta\alpha$) and the maximum adjustment of the ignition timing as a function of said gas composition signal is determined.

6. Apparatus according to claim 5, wherein the ignition event generating means is a digital ignition timing computer including an ignition memory (10) having stored therein optimal ignition timing functions with respect to operating parameters or conditions of the engine;

an address counter (11) connected to and controlled by said crankshaft position signal generating means and said engine operating parameter signal generating means (13, 13a, 14, 14a), the address counter providing addresses, sequentially, to said ignition memory (10);

an accumulator counter (18) receiving data from said ignition memory, in accordance with addresses supplied thereto by said respective position signal generating means and operating parameter signal generating means, and providing a computed ignition event signal when said accumulator counter has reached a predetermined value;

the timing adjustment means affecting the timing of said ignition event generated signal, as determined by said accumulator counter, and the limit means (22) limiting adjustment of the timing of said ignition event to said maximum value in said incremental steps.

7. Apparatus according to claim 6, further including a reference transducer (25) providing a reference signal (BM) at a predetermined angular position of the crankshaft of the engine with respect to said reference position (TDC);

and a transfer switch (17) changing over upon receipt of said reference signal, the transfer switch (17) applying signals derived from said crankshaft position signal generating means (12, 12a), and representative of speed of the engine to said accumulator counter (18) after said reference signal (BM) has been generated;

and wherein adjustment of the timing of generation of said ignition event signal is effected during the time period after generation of said reference signal (BM).

8. Apparatus according to claim 7, wherein the timing adjustment means (20, 121) comprises a comparison matrix, connected to and controlled by said gas composition signal and providing an output signal in dependence on the nature of said gas composition signal (Uλ) and adding a maximum time interval ($\alpha E$) to the time at which said accumulator counter (18) provides an output signal representative of said ignition event to add a maximum predetermined crankshaft angle of rotation of the engine to the angle at which the accumulator counter generated the ignition event signal.

9. Apparatus according to claim 8, wherein the limit stage (22) limits the maximum change of ignition angle added to the crankshaft angle at which the accumulator counter provides said ignition event signal to said incremental angle, with respect to a previously occurring ignition event.

10. Apparatus according to claim 9, further including a speed matrix (28) connected to and controlled by said crankshaft position signal generating means (12, 12a) and having signals representative of speed of the engine applied thereto, said speed matrix (28) furnishing signals to the limit stage (22) which have a timing representative of said incremental angle ($\Delta\alpha$) with respect to the last preceding ignition event in advance of or in retardation of the ignition event signal being generated.

11. Apparatus according to claim 10, wherein the speed matrix is connected to and controlled by the address counter (11) and furnishes its output signals to the limit stage (22) when the address counter (11) has reached a predetermined count state.

12. Apparatus according to claim 11, wherein the speed matrix (28) comprises a crankshaft angle decoding stage;

and wherein the limit stage (22) includes gate circuits (35, 36) and memory means (37, 38) which are interconnected to pass the ignition event signals generated by the ignition event generating means only within said predetermined incremental angle ($\Delta\alpha$) of rotation of the crankshaft.

13. Apparatus according to claim 6, wherein the engine operating parameter signal generating means (13, 13a, 14, 14a) includes a load transducer (13) providing a load-dependent output signal (p) and a temperature transducer, providing a temperature output signal (Sδ);

the ignition memory (10) storing a load characteristic for normal operating temperature operation of the engine and for cold temperature operation of the engine, and the address counter addresses the memory portions of the ignition memory (10) representative of said normal temperature and cold temperature load characteristics portion in accordance with the temperature signal derived from the temperature sensor.

14. Apparatus according to claim 6, wherein the timing adjustment stage includes a matrix circuit (121) connected to and controlling the initial count state of said address counter (11) whereby the address counter will furnish address numbers to said ignition memory (10) in dependence on the nature of the gas composition signal, whereby the content in the memory will be shifted and the accumulator counter will accumulate count numbers based on the shifted characteristic.

15. Apparatus according to claim 6, wherein the ignition memory (10) stores increments of the respective characteristics, and the accumulator counter (18) includes a memory to generate the entire characteristics by algebraically adding the increments furnished thereto by the ignition memory (10) in accordance with the addresses furnished to the ignition memory (10) by the address counter (11).

16. Apparatus according to claim 5 wherein the ignition event generating means comprises an ignition event computer (5) having stored therein a plurality of load ignition timing adjustment curves;

input means ($S_{LK}$) selecting one of said load curves to control ignition timing;

and wherein the gas composition output signal is connected to said input means to match the change of the ignition angle to the load condition of the engine due to selection of the load curve under control of a signal on said input means ($S_{LK}$).

* * * * *